(12) United States Patent
Walker et al.

(10) Patent No.: US 7,853,529 B1
(45) Date of Patent: Dec. 14, 2010

(54) METHOD AND DEVICE FOR GENERATING A SINGLE-USE FINANCIAL ACCOUNT NUMBER

(75) Inventors: Jay S. Walker, Ridgefield, CT (US);
Bruce Schneier, Minneapolis, MN (US);
Sanjay K. Jindal, Wilton, CT (US);
Daniel E. Tedesco, Monroe, CT (US)

(73) Assignee: Walker Digital, LLC, Stamford, CT (US)

( * ) Notice: Subject to any disclaimer, the term of this patent is extended or adjusted under 35 U.S.C. 154(b) by 1417 days.

(21) Appl. No.: 09/694,191

(22) Filed: Oct. 23, 2000

Related U.S. Application Data

(63) Continuation of application No. 08/919,339, filed on Aug. 28, 1997, now Pat. No. 6,163,771.

(51) Int. Cl.
*G06F 21/00* (2006.01)
(52) U.S. Cl. .............................. 705/55; 705/38; 705/39
(58) Field of Classification Search .................. 705/44, 705/50, 64, 39, 55, 38
See application file for complete search history.

(56) References Cited

U.S. PATENT DOCUMENTS

| | | | |
|---|---|---|---|
| 3,376,661 A | 4/1968 | Hulett | 283/76 |
| 4,016,405 A * | 4/1977 | McCune et al. | 235/380 |
| 4,023,012 A | 5/1977 | Ano et al. | 235/379 |
| 4,048,475 A | 9/1977 | Yoshida | 235/380 |
| 4,269,874 A * | 5/1981 | Pryor et al. | 427/282 |
| 4,395,628 A | 7/1983 | Silverman et al. | 235/382 |
| 4,575,621 A | 3/1986 | Dreifus | |
| 4,599,509 A | 7/1986 | Silverman et al. | 235/382 |
| 4,629,874 A | 12/1986 | Pugsley et al. | |
| 4,667,087 A | 5/1987 | Quintana | 235/380 |
| 4,679,236 A | 7/1987 | Davies | |
| 4,707,592 A | 11/1987 | Ware | |

(Continued)

FOREIGN PATENT DOCUMENTS

JP  363307582 A  12/1988

OTHER PUBLICATIONS

"Home Point of Sale" The Perfect Industry, (http://www.hpos.com/), download date: Mar. 10, 1998.

(Continued)

*Primary Examiner*—Pierre E Elisca
(74) *Attorney, Agent, or Firm*—Fincham Downs, LLC; Michael Downs

(57) ABSTRACT

A device for facilitating financial account transactions is described which includes a processing unit including a cryptographic processor. The device also includes an input unit, a display unit and a memory device connected to the processing unit. The memory device contains a private cryptographic key, a first data element and a second data element. The processing unit encrypts the first data element using the private cryptographic key and the second data element, modifies the second data element, combines the encrypted first data element and the second data element to generate a single-use financial account identifier, and displays the single-use financial account identifier. This identifier is then transmitted to a central processor for authorization of the transaction. The central processor extracts and decrypts data elements from the transmitted identifier using the private cryptographic key, compares those data elements with data elements stored in a memory, and verifies the single-use financial account identifier in accordance with the comparison.

8 Claims, 17 Drawing Sheets

U.S. PATENT DOCUMENTS

| | | | |
|---|---|---|---|
| 4,720,860 A | | 1/1988 | Weiss |
| 5,010,485 A | | 4/1991 | Bigari |
| 5,163,097 A | * | 11/1992 | Pegg ........................ 705/44 X |
| 5,163,098 A | | 11/1992 | Dahbura |
| 5,192,947 A | | 3/1993 | Neustein |
| 5,231,666 A | | 7/1993 | Matyas ........................ 705/75 |
| 5,311,594 A | | 5/1994 | Penzias ...................... 713/183 |
| 5,317,636 A | | 5/1994 | Vizcaino ...................... 705/65 |
| 5,361,062 A | | 11/1994 | Weiss et al. ................. 340/5.26 |
| 5,420,926 A | | 5/1995 | Low et al. |
| 5,434,398 A | | 7/1995 | Goldberg |
| 5,457,747 A | | 10/1995 | Drexler et al. .............. 713/186 |
| 5,478,994 A | | 12/1995 | Rahman et al. |
| 5,479,530 A | * | 12/1995 | Nair et al. ................... 382/119 |
| 5,485,510 A | | 1/1996 | Colbert ....................... 379/145 |
| 5,485,519 A | | 1/1996 | Weiss ......................... 713/185 |
| 5,509,070 A | | 4/1996 | Schull ........................ 294/86.4 |
| 5,559,313 A | | 9/1996 | Claus et al. .................. 705/30 |
| 5,585,787 A | | 12/1996 | Wallerstein ................ 340/5.42 |
| 5,590,038 A | | 12/1996 | Pitroda ........................ 705/41 |
| 5,627,355 A | | 5/1997 | Rahman et al. |
| 5,649,118 A | | 7/1997 | Carlisle et al. ................ 705/41 |
| 5,724,424 A | | 3/1998 | Gifford |
| 5,727,163 A | * | 3/1998 | Bezos ......................... 705/27 |
| 5,748,737 A | | 5/1998 | Daggar ........................ 705/41 |
| 5,754,653 A | | 5/1998 | Canfield ...................... 705/75 |
| 5,799,285 A | | 8/1998 | Klingman .................... 705/26 |
| 5,826,245 A | | 10/1998 | Sandberg-Diment |
| 5,845,267 A | | 12/1998 | Ronen |
| 5,883,452 A | | 3/1999 | Masuda |
| 5,883,810 A | * | 3/1999 | Franklin et al. .............. 705/44 |
| 5,899,980 A | | 5/1999 | Wilf et al. |
| 5,903,830 A | | 5/1999 | Joao et al. |
| 5,905,736 A | | 5/1999 | Ronen et al. |
| 5,913,203 A | * | 6/1999 | Wong et al. .................. 705/39 |
| 5,953,710 A | | 9/1999 | Fleming |
| 5,955,961 A | | 9/1999 | Wallerstein |
| 5,956,699 A | * | 9/1999 | Wong et al. .................. 705/39 |
| 6,000,832 A | | 12/1999 | Franklin et al. |
| 6,014,650 A | * | 1/2000 | Zampese ..................... 705/44 |
| 6,049,785 A | | 4/2000 | Gifford |
| 6,064,879 A | * | 5/2000 | Fujiwara et al. ............. 455/419 |
| 6,068,192 A | | 5/2000 | McCabe et al. |
| 6,154,879 A | | 11/2000 | Pare, Jr. et al. |
| 6,163,771 A | * | 12/2000 | Walker et al. ................. 705/18 |
| 6,195,649 B1 | | 2/2001 | Gifford |
| 6,202,055 B1 | * | 3/2001 | Houvener et al. ............. 705/44 |
| 6,253,188 B1 | | 6/2001 | Witek et al. |
| 6,330,544 B1 | | 12/2001 | Walker et al. |
| 6,370,525 B1 | | 4/2002 | Kaufman |
| 6,466,901 B1 | | 10/2002 | Loofbourrow et al. |
| 6,470,490 B1 | | 10/2002 | Hansen |
| 6,484,166 B1 | | 11/2002 | Maynard |
| 2002/0077837 A1 | * | 6/2002 | Krueger et al. .................. 705/1 |
| 2002/0116341 A1 | * | 8/2002 | Hogan et al. ................... 705/64 |
| 2002/0120584 A1 | * | 8/2002 | Hogan et al. ................... 705/67 |

OTHER PUBLICATIONS

"Prepaid Smart Card Techniques: A Brief Introd . . . ", (http://www.digicash.com/news/archive/cardcom.html), download date: Mar. 10, 1998.

Office Action for U.S. Appl. No. 08/919,339 mailed Mar. 30, 1999, 7 pp.

Office Action for U.S Appl. No. 08/919,339 mailed Jul. 20, 1999, 6 pp.

Notice of Allowability for U.S. Appl. No. 08/919,339 mailed Nov. 22, 1999, 6 pp.

Notice of Allowance and Fees Due for U.S. Appl. No. 08/919,939 mailed Aug. 1, 2000, 4 pp.

Notice of Allowance for U.S. Appl. No. 09/542,676 mailed Sep. 8, 2005, 3 pp.

Office Action for U.S. Appl. No. 09/542,676 mailed Aug. 5, 2004, 6 pp.

Office Action for U.S. Appl. No. 09/542,676 mailed Oct. 14, 2003, 6 pp.

Office Action for U.S. Appl. No. 09/542,676 mailed Jan. 31, 2003, 6 pp.

Office Action for U.S. Appl. No. 09/542,676 mailed Jul. 8, 2002, 5 pp.

Office Action for U.S. Appl. No. 11/422,986 mailed Mar. 5, 2007, 10 pp.

Office Action for U.S. Appl. No. 11/422,986 mailed Sep. 12, 2006, 4 pp.

Office Action for U.S. Appl. No. 11/422,978 mailed Mar. 5, 2007, 4 pp.

Office Action for U.S. Appl. No. 11/422,993 mailed Mar. 5, 2007, 4 pp.

Office Action for U.S. Appl. No. 11/338,152 mailed Aug. 8, 2007, 7 pp.

Office Action for U.S. Appl. No. 11/338,152 mailed Mar. 5, 2007, 8 pp.

Office Action for U.S. Appl. No. 11/338,152 mailed Sep. 11, 2006, 4 pp.

Office Action for U.S. Appl. No. 11/422,978 mailed Aug. 27, 2008, 6 pp.

Office Action for U.S. Appl. No. 11/422,986 mailed Feb. 26, 2010, 8 pp.

Office Action for U.S. Appl. No. 11/422,993 mailed Sep. 5, 2008, 7 pp.

Office Action for U.S. Appl. No. 11/338,152 mailed May 11, 2010, 11 pp.

Office Action for U.S. Appl. No. 11/338,152 mailed Oct. 21, 2008, 7 pp.

Office Action for U.S. Appl. No. 11/338,152 mailed Jan. 16, 2008, 5 pp.

Notice of Allowance for U.S. Appl. No. 11/338,152 mailed Sep. 20, 2010, 5 pp.

* cited by examiner

| CARDHOLDER ACCOUNT NUMBER 501 | NAME 502 | ADDRESS 503 | PHONE NUMBER 504 | TOTAL CREDIT LINE 505 | AVAILABLE CREDIT LINE 506 | EXPIRATION DATE 507 |
|---|---|---|---|---|---|---|
| 2222-3333-4444-5555 | TIM JOHNSON | 99 MAIN ST. HOMETOWN, CT 22222 | (333) 444-5555 | $2,000 | $1,233 | 05/98 |
| 9999-8888-7777-6666 | SUE MARVIN | 10 CENTER ST. ROCKPORT, NJ 99999 | (999) 111-2222 | $3,500 | $3,500 | 08/99 |

| CARDHOLDER PRIVATE KEY 601 | CARDHOLDER ACCOUNT NUMBER 501 | NONCE 602 |
|---|---|---|
| 1100010101110 | 2222-3333-4444-5555 | 1011011100011010 |
| 1000011111101 | 9999-8888-7777-6666 | 0111011110010100 |

| CARDHOLDER ACCOUNT NUMBER 501 | EXPIRATION DATE 507 | TRANSACTION AMOUNT 702 | MERCHANT IDENTIFICATION NUMBER 703 | INITIALIZATION VARIABLE 704 |
|---|---|---|---|---|
| 2222-3333-4444-5555 | 05/98 | $23.98 | 123456 | 27 |
| 9999-8888-7777-6666 | 08/99 | $56.34 | 654321 | 96 |

| CARDHOLDER ACCOUNT NUMBER 501 | CARDHOLDER NAME 502 | CREDIT CARD NUMBER 1301 | STATUS 1302 |
|---|---|---|---|
| 2222-3333-4444-5555 | TIM JOHNSON | 3122-2222-3333-6644 | USED |
| | | 3122-1222-3333-7697 | NOT USED |
| | | ⋮ | ⋮ |
| | | 3122-1222-3394-4181 | NOT USED |
| 9999-8888-7777-6666 | SUE MARVIN | 1454-8000-3366-7171 | USED |
| | | 1454-8000-3366-7172 | USED |
| | | ⋮ | ⋮ |
| | | 1454-8000-3989-6097 | NOT USED |

| CARDHOLDER ACCOUNT NUMBER 501 | EXPIRATION DATE 507 | TRANSACTION AMOUNT 702 | MERCHANT IDENTIFICATION NUMBER 703 |
|---|---|---|---|
| 2222-3333-4444-5555 | 05/22/98 | $23.98 | 123456 |
| 9999-8888-7777-6666 | 08/01/99 | $56.34 | 654321 |

FIG. 14

METHOD AND DEVICE FOR GENERATING A SINGLE-USE FINANCIAL ACCOUNT NUMBER

This application is a continuation of U.S. patent application Ser. No. 08/919,339, filed Aug. 28, 1997 for "Method and Device for generating a single-use financial account number" issued on Dec. 19, 2000 as U.S. Pat. No. 6,163,771.

BACKGROUND OF THE INVENTION

This invention relates to a method and a device for generating a single-use, transaction-specific financial account number, thereby providing a high level of security for financial transactions, particularly credit card transactions.

There are over 500 million general purpose, retail, oil and other credit card accounts in the United States (hereafter called "cards"). Worldwide the figure is almost 1 billion such cards. Typically, each authorized user of an account is issued a credit card: a physical plastic object with an embossed account number and cardholder name appearing on its face. Anti-counterfeiting indicia, such as holograms, photographs or signatures, may also appear on the card to discourage wrongful usage.

Since the credit card number is unchanging, there is a risk of fraudulent use by anyone who steals the number. The key element of defense against a fraudulent user impersonating the authentic cardholder is signature verification. A signature area appears on the back of most cards, and when a person receives a new credit card, he is instructed to sign his name on the back of the card. A merchant who accepts the card will then be able to compare the signature specimen that appears on the back of the card to the signature on the sales draft signed by the consumer at the time of purchase. In some cases, the merchant may also ask for photo ID before accepting the card or as a method of checking that the signatures are for the person whose name appears on the face of the card.

In addition to examining the signature on the card, most merchants who accept credit cards use a small device known as an authorization terminal. The authorization terminal is capable of reading information disposed on a magnetic stripe located on the back of the credit card. In some cases, this stripe also contains other difficult-to-counterfeit information. To process a credit card purchase, the merchant passes the card through the magnetic stripe reader of the terminal and enters the amount of the purchase. The information is then sent by the device over a phone or wireless connection to a central database for account number verification and purchase authorization. A card that has been reported lost or stolen is declined. If magnetic stripes on credit cards become damaged and unreadable, the authorization terminal permits manual entry of the credit card number as it appears embossed on the face of the card.

With the dramatic growth of direct marketing, an increasing share of all card purchases are being made without the physical presentation of the card to the selling merchant. Instead, the consumer simply relays the card number to the merchant, and the merchant enters the card number into a computer terminal which is also designed to handle the order processing function. As electronic commerce grows over the next decade, the percentage of such remote, non-face-to-face purchases can be expected to grow. This poses an increasingly acute problem for the entire credit card system, since credit card numbers are highly insecure.

To protect against thieves fraudulently creating credit card numbers and then using them for remote purchasing, a check-digit algorithm is typically employed for credit card account numbers which makes it comparatively difficult (approximately 1 chance in 500,000) to pick a random 16-digit number that is also a valid credit card account number. In addition, since not every valid credit card account number is currently in use, simply making up a valid number is, in itself, not enough to get an authorization code from the central authorizing network. In addition to passing the check-digit test, a bank must have issued that number to an active customer.

To further help combat mail-order based credit card fraud, both Visa and MasterCard have deployed databases that allow a merchant to verify that a given credit card account number is connected to a specific billing address. Visa calls this service the Address Verification Service. The theory behind the service is that a thief (for example, a dishonest restaurant waiter) might be able to use a credit card receipt slip to steal an active account number, but if he tries to use that number for a mail order purchase he would not know the correct address associated with that number. Even if a thief were to obtain the cardholder's address, this service can allow a merchant to compare the shipping address of the catalog order to the current billing address for that account number and thus possibly identify any suspicious activity.

Currently, credit cards also incorporate an expiration date after which they are no longer valid. These dates are typically one to two years after the card is issued. The reason for an expiration date is to reduce the issuing bank's risk of cards being presented after an account is closed. Since the expiration date is an absolute indication of whether or not to accept a card, an old card that is lost or misplaced eventually expires with minimal risk that it will be found and used improperly.

In addition, credit card information and transaction information may be encrypted using well known encryption schemes like RSA's public key cryptography. For example, SET is a joint Visa/MasterCard standard for encrypting credit card numbers transmitted over the Internet.

In spite of these safeguards, credit card security is vulnerable to a number of attacks by unscrupulous persons. Some examples of these attacks are as follows:

a) Theft of cards: Any conventional credit card which is stolen can be misused, either at a merchant's establishment by forging the signature on the card onto a sales slip, or by ordering merchandise or services remotely.

b) "Sniffing:" Credit card transaction information being transmitted over public networks can possibly be intercepted and captured or "sniffed." The sniffed information can then be used to create counterfeit cards and/or order goods and services. For example, if a hacker were to break the SET encryption scheme, the hacker could sniff out credit card numbers and misuse them. Re-submission of the sniffed encrypted credit card numbers to the same merchant is known as "replay."

A large-scale attack on credit-card number security would threaten the entire credit card system. For example, if someone were to steal 1 million active credit card account numbers, and were also able to steal the billing addresses to which those cards were issued, the entire credit card system would be threatened. At the very least, mail order sales might have to be suspended until new safeguards were put in place. At worst, a flood of counterfeit cards, with correct account numbers and valid names embossed on their faces, could be created.

With the advent of almost instantaneous worldwide money transfers, a band of organized thieves could clear hundreds of millions or even billions of dollars of charges through the authorization system and then wire that money to a safe haven before cardholders suspected that their cards had been charged an unauthorized amount. If the theft also involved data revealing each account's unused available credit line, such criminal activity might be even harder to detect before it was too late to rescind the wire transfers of stolen money.

Cards which store information, as opposed to merely having embossed numbers, are known in the art. Such "smart cards" are becoming increasingly common. These cards contain a small microprocessor capable of storing data in a secure fashion and of performing computer operations on such data. Smart cards may have built-in small numeric display screens. In particular, smart cards used for distribution of cryptographic keys, display keys on their display screens.

Smart cards are used to authenticate card users and to authenticate the card/user combination to a third party. These cards are also used for controlling access to computer systems and databases and entry into secure areas. Northern Telecom offers a credit card sized smart card called Entrust which contains a microchip that stores encoded, private keys.

Hardware tokens such as Security Dynamics' SecurID card use a "time synchronous methodology" to produce passwords every 30 seconds.

Wire transfer calculator-style devices are also known in the art. Such devices are the size of a credit card and contain a tamper-resistant "secure perimeter" within which is disposed a clock and a cryptoprocessor. These devices also have a small LCD alpha-numeric display screen and a numeric keypad for data entry.

A number of security devices and methods involving credit cards have been disclosed. For example, U.S. Pat. No. 5,311,594, "Fraud Protection For Card Transactions," describes a challenge-response method for fraud protection wherein credit card holders are authenticated based on their responses to randomly asked questions like their mother's phone number, their graduation year, birth date, etc. The responses are checked against prestored information in a database.

U.S. Pat. No. 5,457,747, "Anti-Fraud Verification System Using a Data Card," describes a biometric system for deterring credit card fraud. Credit cards have two magnetic stripes, one that has been permanently encoded with the card holder's biometric information and one that an ATM can write onto. To use the card, the card holder supplies the same biometric information at a verification terminal. The terminal checks the biometric information supplied by the card holder against that recorded on the magnetic stripe. If the biometrics match, the terminal will write a transaction authorization onto the magnetic stripe.

U.S. Pat. No. 5,485,519, "Enhanced Security For a Secure Token Code," describes a method for enhancing security for a private key stored in a smart card. A user input PIN is combined algorithmically with a code resident in the smart card to produce the private key. The private key is not stored in the smart card except for short intervals when the card is actually being used by an authorized user who has input his PIN.

SUMMARY OF THE INVENTION

This invention provides a method and a device to facilitate secure electronic commerce, secure remote credit card purchases, and secure conventional credit card purchases wherein the customer is assured that the merchant or an intercepting third party cannot misuse any credit card information.

According to one aspect of our invention, a method for generating a single-use financial account identifier is provided which includes the steps of accessing a first data element specific to an account; accessing a second data element including transaction-specific data; and combining the first data element and the second data element to produce the single-use financial account identifier.

According to another aspect of our invention, a device for facilitating, credit transactions is provided which includes a processing unit including a cryptographic processor. The device also includes an input unit connected to the processing unit for inputting information thereto, and a display unit connected to the processing unit for displaying a processing result. In addition, the device includes a memory device connected to the processing unit. The memory device contains a private cryptographic key, a first data element, a second data element and a program adapted to be executed by the processing unit. In accordance with the program, the processing unit encrypts the first data element using the private cryptographic key and the second data element, modifies the second data element, combines the encrypted first data element and the second data element to generate a single-use financial account identifier, and displays the single-use financial account identifier using the display unit.

According to a further aspect of our invention, a system for verifying a financial account identifier is provided which includes a processing unit including a cryptographic processor. The system also includes a communications unit, connected to said processing unit, for transmitting and receiving information regarding the financial account identifier, and a memory device. The memory device contains a private cryptographic key, a first data element, a second data element and a program adapted to be executed by the processing unit. In accordance with the program, the processing unit receives a single-use financial account identifier, extracts therefrom a third data element and a fourth data element, decrypts the third data element using the private cryptographic key and the fourth data element, compares the decrypted third data element with the first data element in a first comparison, compares the fourth data element with the second data element in a second comparison, and verifies the received financial account identifier in accordance with the first comparison and the second comparison.

According to still another aspect of our invention, a method for providing a single-use financial account identifier includes the steps of: providing a memory storing data representing a plurality of predetermined single-use financial account identifiers, data representing a status for each single-use financial account identifier, and data representing a pointer to one of the single-use financial account identifiers; identifying the single-use financial account identifier based on the pointer data; and transmitting a signal to an output device to present the single-use financial account identifier.

According to a further aspect of our invention, a device for providing a single-use financial account identifier is provided which includes a memory, an output device and a processor coupled to the memory and to the output device. The memory stores data representing a plurality of predetermined single-use financial account identifiers, data representing a status for each of the predetermined single-use financial account identifiers, and data representing a pointer to one of the predetermined single-use financial account identifiers. The output device presents the single-use financial account identifier. The processor is configured to identify the single-use financial account identifier based on the data representing a pointer, and to transmit a signal to the output device to present the single-use financial account identifier.

BRIEF DESCRIPTION OF THE DRAWINGS

FIG. 5 shows in tabular form the credit card account holder database.

FIG. 6 shows in tabular form the account holder secret key database.

FIG. 7 shows in tabular form the credit card transaction database according to the first embodiment of the invention.

FIG. 13 shows in tabular form the credit card number database.

FIG. 14 shows in tabular form the credit card transaction database according to the second embodiment of the invention.

DETAILED DESCRIPTION OF THE PREFERRED EMBODIMENTS

Figure 1:
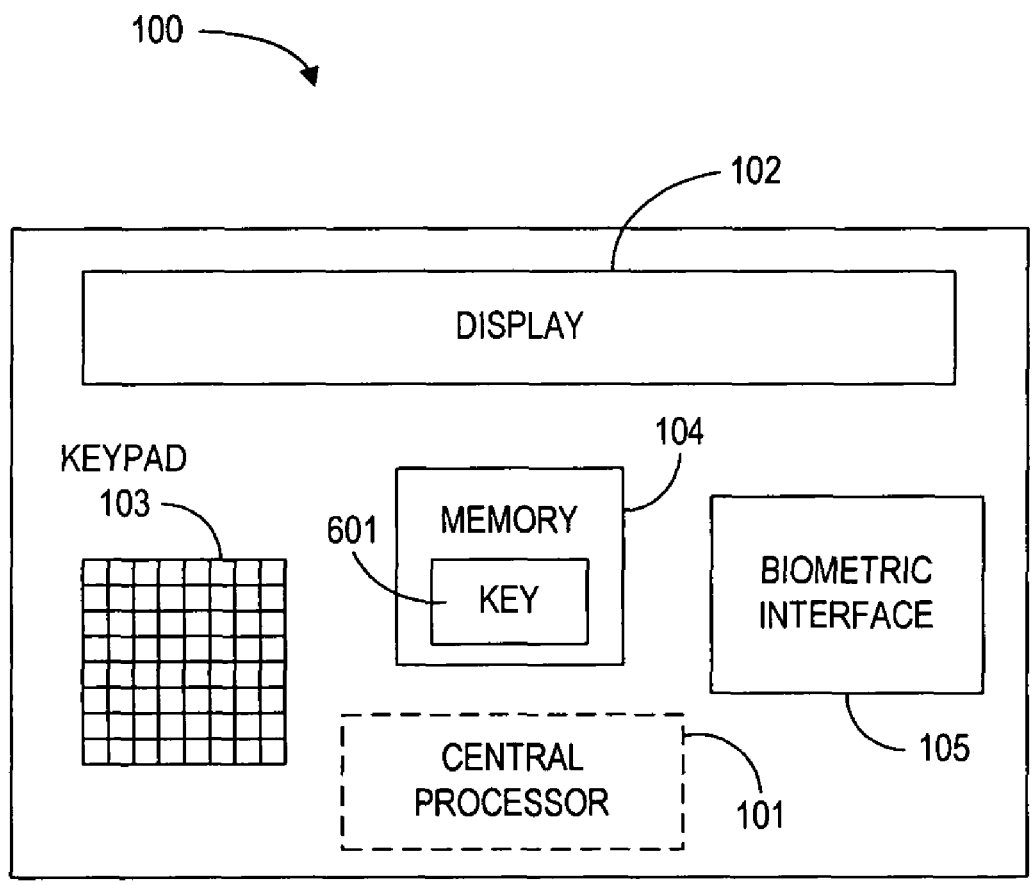
FIG. 1 is a block diagram of the hand-held smart card device in accordance with the present invention.

FIG. 1 is a schematic diagram of a device 100 for generating a single-use credit card number in accordance with this invention. This device is preferably a smart card, hereinafter referred to as the "device." The device has a keypad 103, a display screen 102, a memory 104 and a central processor 101. Memory 104 contains a key 601, and CPU 101 contains a cryptographic processor. The device may be activated through the input of a unique cardholder identifier such as a personal identification number (PIN) through the keypad 103. Alternatively, the device may include a biometric interface 105, and be activated by the input of a suitable biometric record such as the cardholder's fingerprint.

Figure 2:
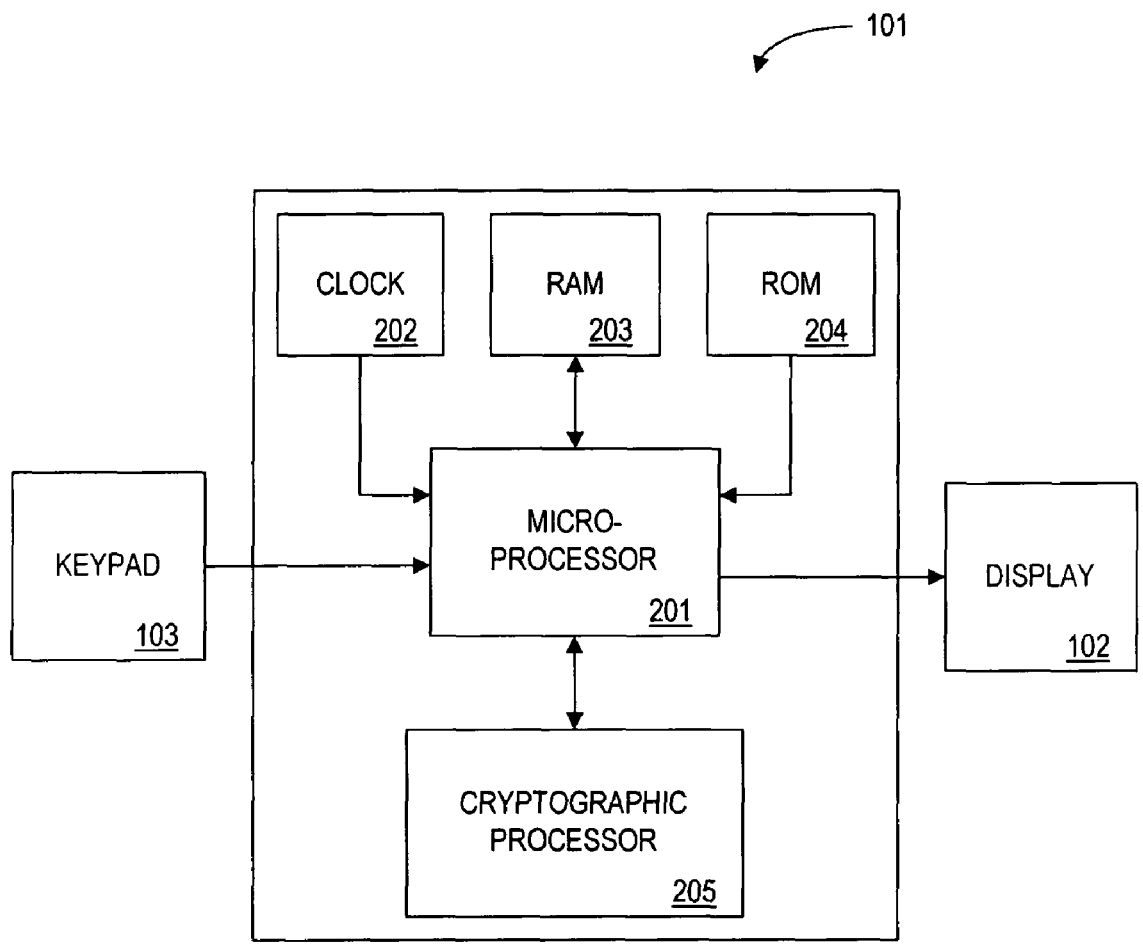
FIG. 2 is a block diagram of the device's central processor.

FIG. 2 is a schematic diagram showing further details of the central processor 101 of device 100. The central processor 101 includes a microprocessor 201. The microprocessor 201 is connected to a clock 202, a random-access memory (RAM) 203, a read-only memory (ROM) 204, and a cryptographic processor 205. In addition, the microprocessor 201 is connected to the keypad 103 for receiving input from the user and to the display 102 for prompting the user or displaying information.

Figure 3A:
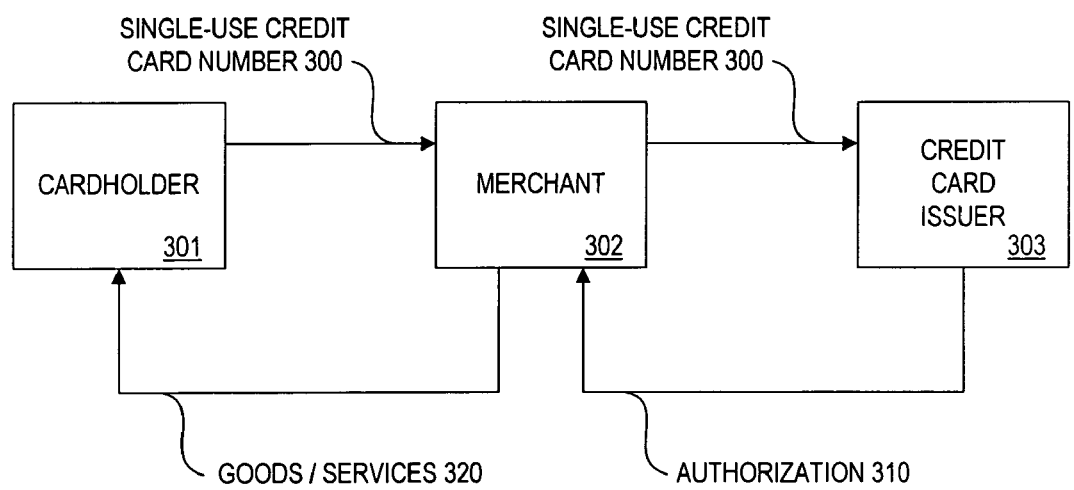
FIG. 3A is a block diagram of the overall system of the present invention.

FIG. 3A is a schematic diagram of the environment in which the method and system of the present invention are used. A cardholder 301, wishing to purchase goods or services from a merchant 302 (not necessarily in person), transmits a single-use credit card number 300 to the merchant. The merchant 302 transmits the single-use credit card number 300 to a credit card issuer 303. The credit card issuer 303 returns an authorization 310 to the merchant, based on which the merchant delivers the desired goods or services 320 to the cardholder.

Figure 3B:
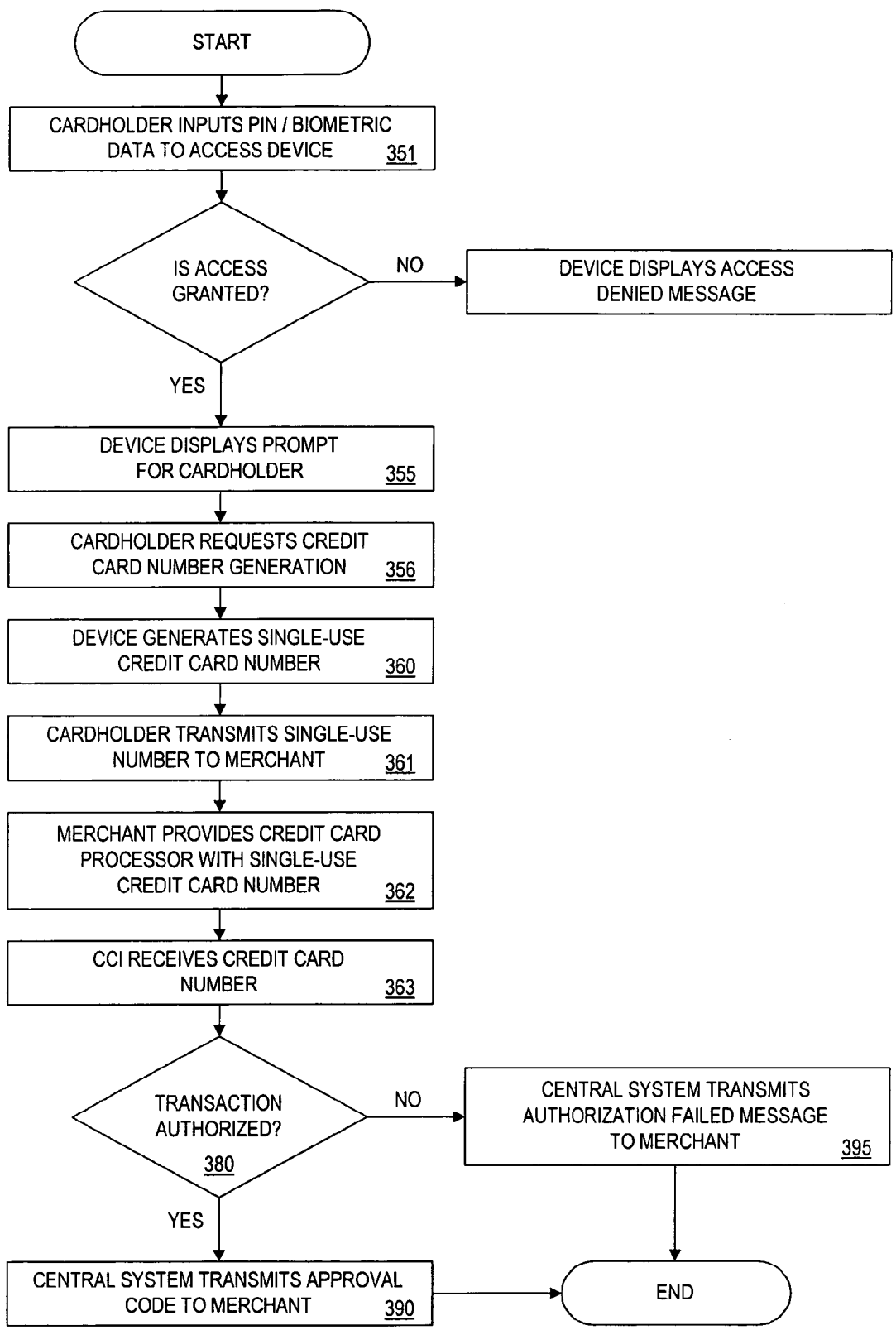
FIG. 3B is a flowchart showing the basic method of the present invention.

FIG. 3B shows the steps of the basic method of using the device in accordance with the present invention. To purchase goods or services in person, via telephone or via the Internet, cardholder 301 uses device 100 to generate a transaction-specific, single-use credit card number. The cardholder first inputs his PIN or biometric data to access the device (step 351). If access is granted, the device responds by querying the cardholder on display 102 whether it should generate a single-use credit card number (step 355). The cardholder responds by requesting generation of a credit card number (for example, by keying "YES"). He may optionally be asked to enter the amount of the purchase in step 356 or a merchant code number provided by the merchant. This number could be only a few digits long since it does not have to be unique to each merchant.

The device then generates a single-use credit card number (step 360); details of the card number generation are explained below. The number is unique for the specific input variables set by the cardholder or by the device. It may also be unique to the specific date and time to avoid so-called "replay" attacks for that card at that merchant with that exact purchase amount. The single-use credit card number is preferably a 16-digit number that can be recognized as a conventional credit card number.

The cardholder transmits the single-use number to the merchant (step 361), and the merchant enters the single-use number into an authorization terminal connected to a central credit card processing system maintained by the credit card issuer (step 362). A check digit may be included in the number to prevent the incorrect keying of the number. The number is sent to the credit card processing system for authorization (step 363). The central system processor maps the single-use credit card number onto a conventional credit card account and determines whether the transaction is authorized (step 380); if so, the central system returns an authorization code for display on the merchant's authorization terminal (step 390); if not, the central system transmits an authorization failed message for display on the merchant's authorization terminal (step 395).

Throughout this discussion, the term "credit card number" refers to a number that is used only one time to perform a specific transaction, and is generated using the device 100; in contrast, the term "account number" refers to an unchanging identifier for the cardholder which is stored in a database maintained by the card issuer.

First Embodiment

Device Private Key Encryption

In this embodiment, the single-use credit card number is generated by the device cryptoprocessor 205, using a private key 601 stored in the device memory 104 (preferably the ROM 204). The encryption data changes with each use of the card, so that the single-use encrypted credit card number is different for each transaction. This credit card number is distinct from the unchanging account number identifying the particular cardholder. It should be noted that knowledge of the account number does not allow an attacker to generate a valid single-use credit card number.

When the single-use credit card number is transmitted to a merchant, the merchant passes the number to the card issuer's central processor for authorization. The central processor decrypts the number based on a known algorithm, determines the true account number, and either authorizes or denies the charge.

Figure 4:
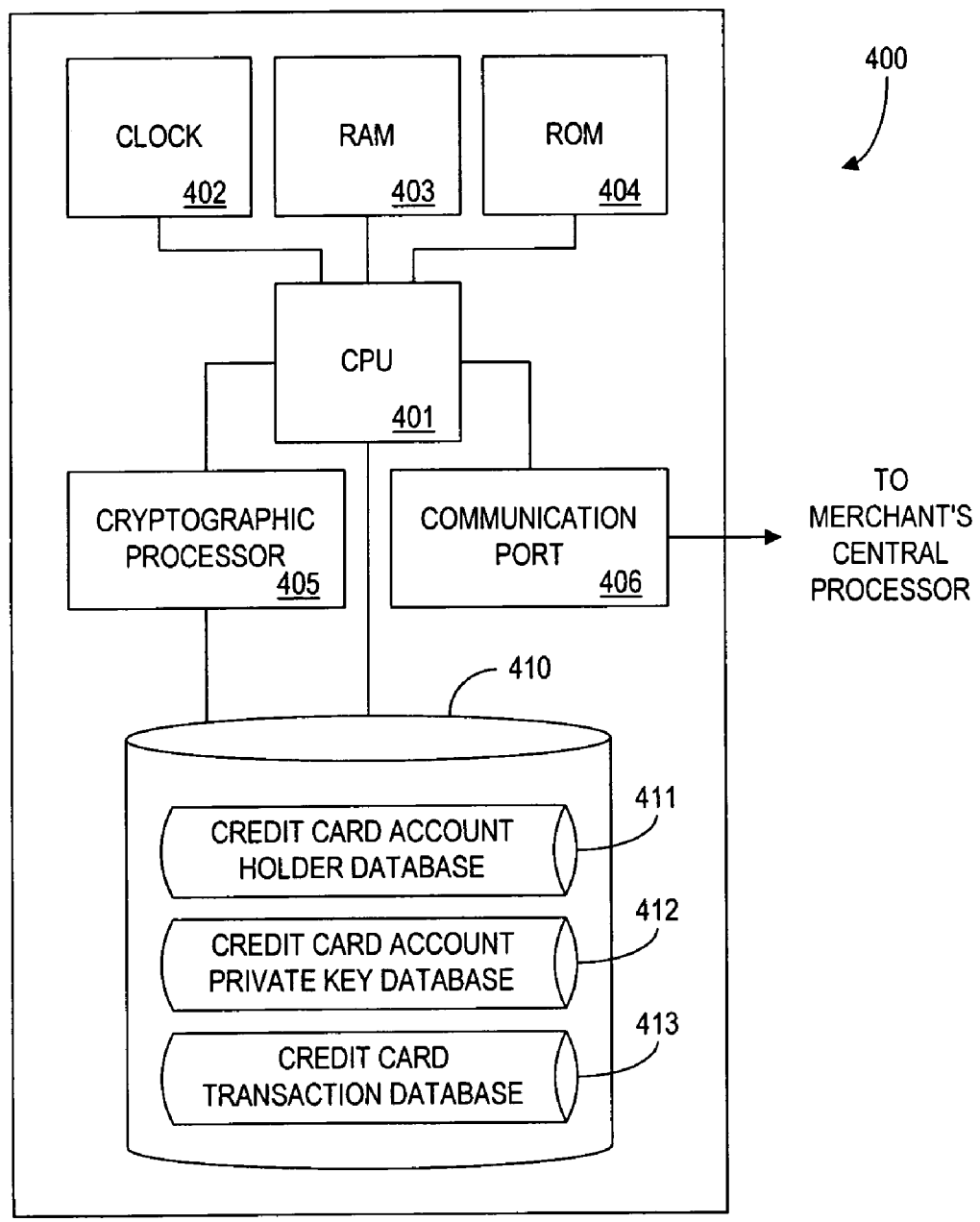
FIG. 4 is a block diagram of the credit card issuer's central processor, with databases as used in accordance with the first embodiment of the invention.

FIG. 4 is a schematic diagram of the credit card issuer's central processor 400. The processor includes a central processing unit (CPU) 401. The CPU is connected to a clock 402, a random-access memory (RAM) 403, a read-only memory (ROM) 404, a cryptographic processor 405, and a communication port 406 for communication with the merchant's central processor. In addition, the CPU 401 is connected to a storage device 410, which includes a credit card account holder database 411, a credit card account private key database 412, and a credit card transaction database 413.

The data structure of the credit card account holder database 411 is shown in FIG. 5. Each record in the database includes the cardholder account number 501, the cardholder's name 502, address 503 and telephone number 504, the original credit line 505 associated with the account, the amount of credit currently available (available credit line 506), and the expiration date 507.

FIG. 6 shows the fields of the credit card account private key database 412. Each entry of this database has the cardholder private key 601 and the associated cardholder account number 501. The private key is thus stored in both the device memory 104 and the database 412. An additional secret piece of information, called a "nonce" 602, is associated with the account number. The nonce is also stored in the device memory 104. The nonce need not be as long as the account number, but should not be easily derived therefrom.

FIG. 7 shows the fields of the credit card transaction database 413. Each record of this database corresponds to one transaction using the card, and includes the account number 501, the expiration date 507 of the card, the transaction amount 702, the merchant identification number 703 and an initialization variable 704. The initialization variable 704 is used to ensure that each credit card number is unique to the particular transaction, thereby preventing a "replay" attack.

In this embodiment, the device memory 104 has stored therein the private key 601, the nonce 602, the initialization variable 704 and the account number 501. The initialization variable is set at 0 (zero) when the card is newly issued, and is incremented each time a single-use credit card number is generated.

The cryptography described herein requires binary data. Current credit card numbers are 16-digit decimal numbers. Since $10^{16}$ is only slightly greater than $2^{53}$, nearly every such decimal number may be represented by a 53-digit binary number. Therefore, in the following discussion it will be assumed that the credit card number is a 53-bit number and that it is then converted to a 16-digit decimal number for transmission or display.

A credit card number consists of an m-bit initialization variable (abbreviated IV), an a-bit account number, and an n-bit nonce (abbreviated N), where m+a+n=53. It should be noted that the nonce may take the place of the check code employed with conventional credit card numbers. If n=16, then the probability that an attacker can generate a valid credit card number is 1 in $2^1$=65536. The parameter n can be varied to change the probability as desired.

The parameters m and a do not necessarily have to be the same size for all credit card holders. However, m should be large enough for any individual cardholder so that he does not use his credit card more than $2^t$ times before the card expires. For most credit card holders a value of m=9 would probably suffice, allowing use of the card 512 times (that is, 5 times a week assuming the card is valid for two years) before it expires.

Figure 8:
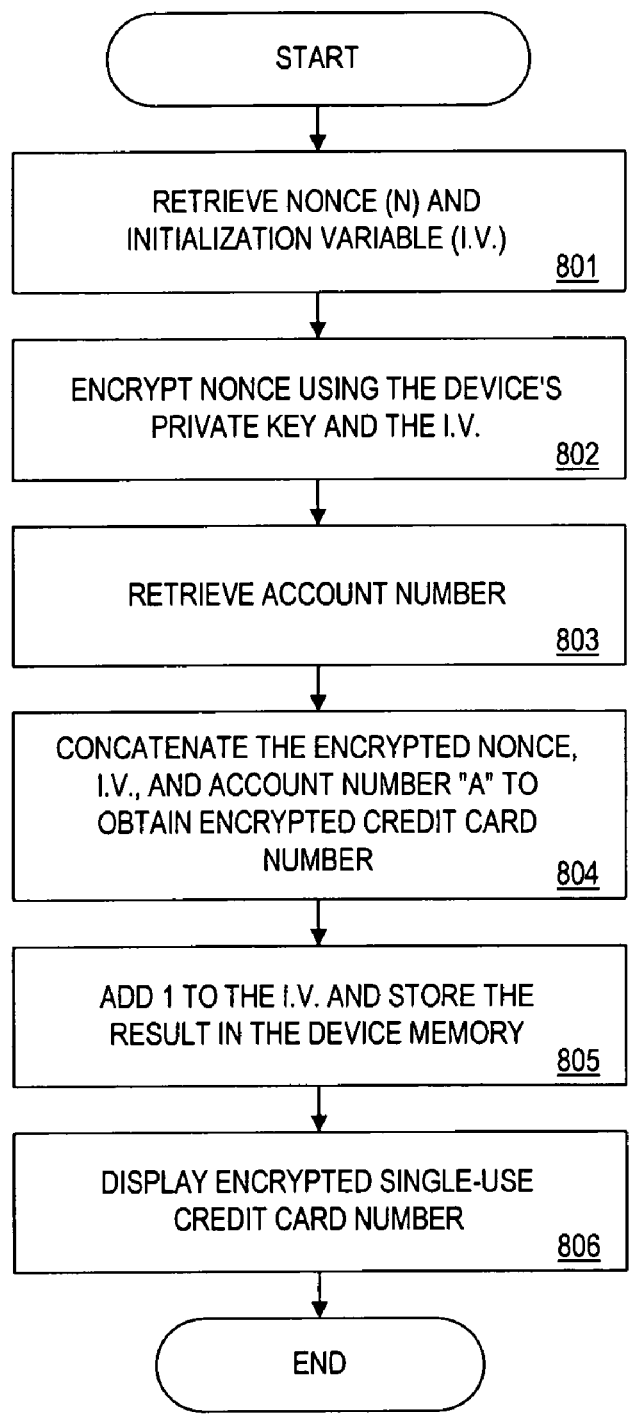
FIG. 8 is a flowchart describing an encryption scheme used to generate a single-use credit card number in accordance with the first embodiment of the invention.

The steps for generating an encrypted single-use credit card number according to this embodiment are shown in FIG. 8. In step 801, the device central processor 101 retrieves the nonce 602 and the initialization variable 704 from the device memory 104. In step 802, the nonce is encrypted using the user's private key K and the IV. Thus $$C=E_K(N, IV)$$

where C represents the encrypted nonce. Both N and C are n-bit values.

The central processor 101 then retrieves the account number from the device memory 104 (step 803). In step 804, the encrypted nonce C, the initialization variable IV, and account number A are concatenated to form an encrypted, single-use credit card number CCN:

CCN=C_IV_A, where _ denotes concatenation.

The initialization variable is incremented and the result is stored in the device memory 104 (step 805):

IV=IV+1

The resulting credit card number CCN is then displayed on the display screen 102 (step 806) and read, shown or otherwise transmitted to the merchant. The merchant transmits this number to the issuer's central processor 400 for authorization of the transaction.

Figure 9A:
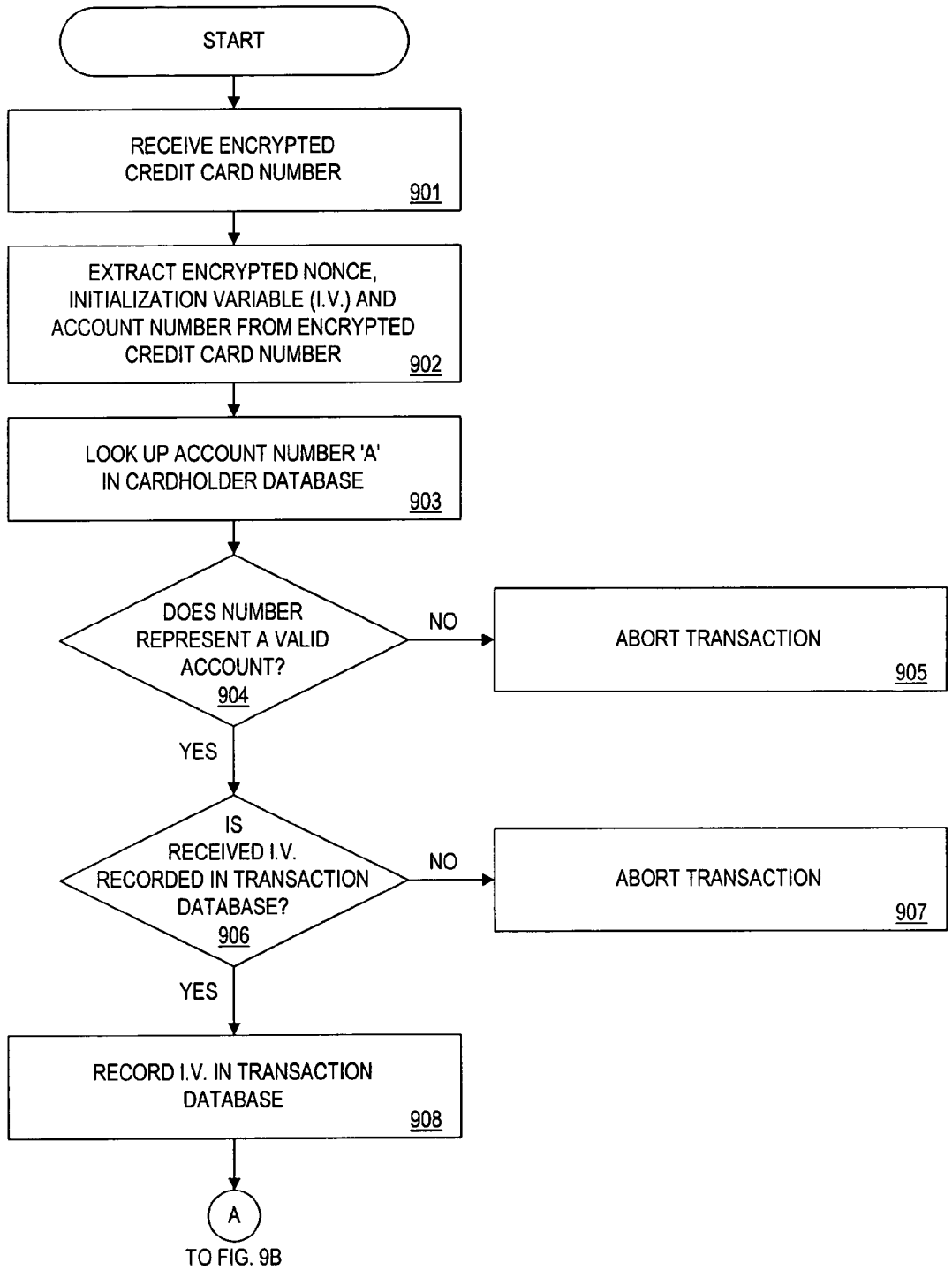
FIGS. 9A and 9B are connected flowcharts describing the operations performed by the central processor of a credit card issuer to generate an authorization code, in accordance with the first embodiment of the invention.
Figure 9B:
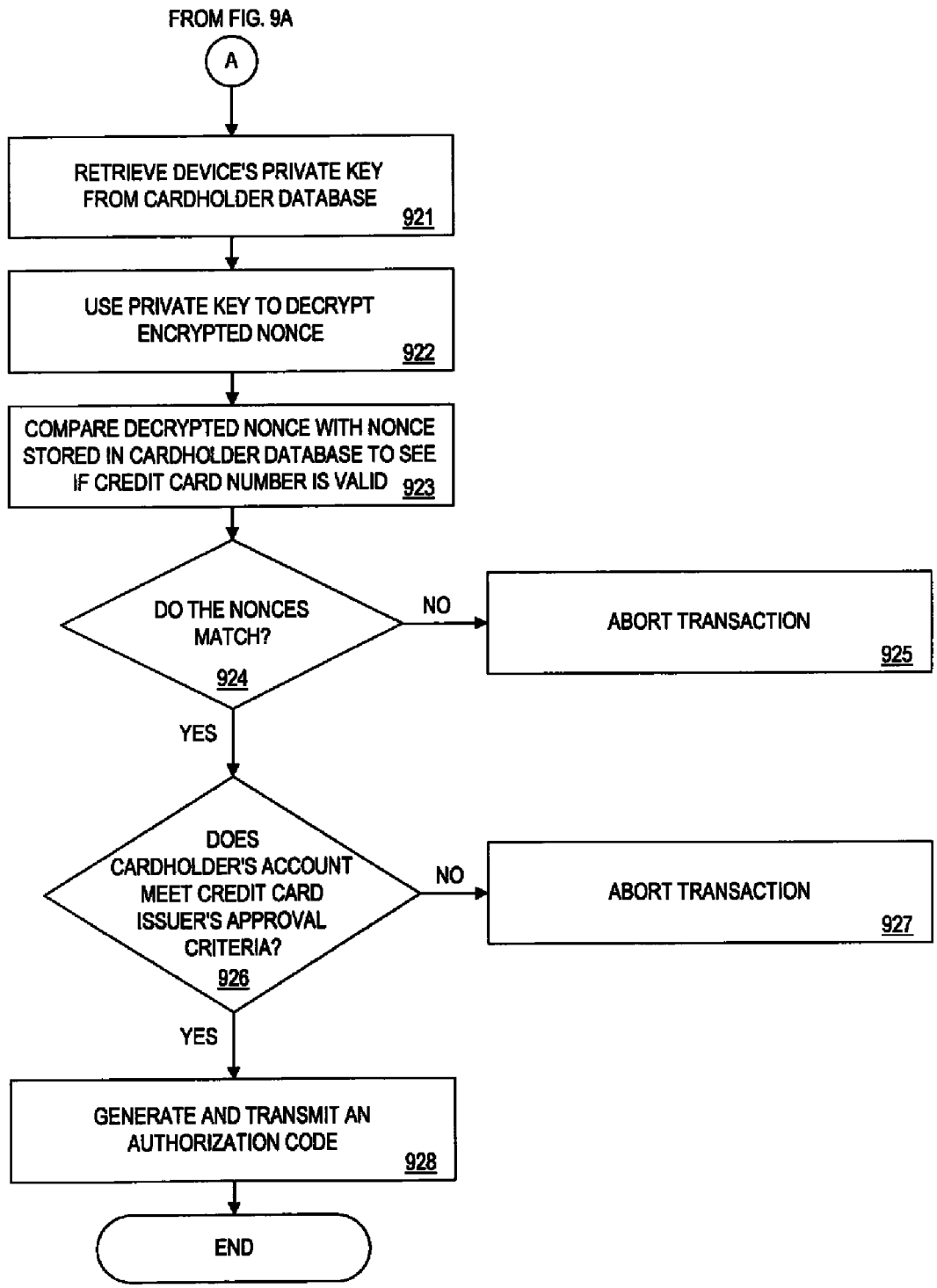

FIGS. 9A and 9B show the steps for generating an authorization code for the transaction. In step 901 the issuer's central processor 400 receives the single-use credit card number transmitted by the merchant.

To verify the card number, the credit card issuer's central processor first extracts the encrypted nonce C, the initialization variable IV, and account number A from the credit card number (step 902). The processor then retrieves the extracted account number from the cardholder account database 411 (step 903), and determines whether the account number is valid (step 904). If the account number is not valid, the transaction is aborted (step 905). If the account number is valid, the processor looks up the account number in the credit card transaction database 413 to determine whether the card holder has previously used the initialization variable IV (step 906). If the cardholder has done so, the transaction is aborted (step 907). If the initialization variable has not been used, the incremented initialization variable is stored in the credit card transaction database 413 (step 908).

In step 921, the processor retrieves the card holder's private key K in the private key database 412. The private key K then is used to decrypt the encrypted nonce (step 922). This recovers the original nonce N:

$$N=D_K(C, IV).$$

The decrypted nonce N is compared against the nonce 602 stored in the account private key database 412 (step 923). If they match (step 924) then the credit card number is considered valid; otherwise the transaction is aborted (step 925).

If the card is found to be valid, and if the cardholder's account meets the credit card issuer's approval criteria (step 926), then the issuer's central processor generates an authorization code and transmits the code to the merchant (step 928). If not, then the transaction is aborted (step 927).

Approval criteria are issuer specific and may include, but are not limited to, the following: account must be in good standing (not past due); sufficient credit must be available (some issuers may approve purchases that exceed available credit by a specified margin), the card should not have been reported stolen/lost; and the account should not be closed.

There are two types of ciphers which can be used to encrypt the data (in this embodiment, the nonce N and initialization variable IV): stream ciphers and block ciphers. Stream ciphers can be used with minor modification so that different initialization variables will result in different ciphertext. The amount of information that must be encrypted in this system is smaller than the blocksize of most block encryption algorithms. However, a modified variant of Cipher Feedback Mode may be used to encrypt small amounts of data and has some additional security features.

Accordingly, one possible encryption method uses a stream cipher. Conventional ciphers use a secret key k to produce a stream of data. The data is then combined with the unencrypted data (e.g. by XORing them together) to produce the encrypted text. On the other hand, to encrypt an n-bit value N using initialization variable IV and key k, a stream cipher may be used to generate n(IV+1) bits of data, with N then combined with the last n bits of the resulting data.

Another way to encrypt the data is to use a block cipher in 1-bit feedback CFB-mode. However, this has some undesirable properties which may allow an attacker to deduce the unencrypted form of encrypted data. While an attacker cannot generate a valid credit card number without knowledge of the user's private key, knowing the user's nonce undermines the security of the account. To avoid this problem the following variant may be used:

1. The input of the block cipher $I_i$ consists of the IV concatenated with a l-m bit shift register (where m is the number of bits in the IV and we are using a 1-bit block cipher). Let $S_i$ be the state of the shift register. Then $S_0=1$ and $I_0=IV\_S_0$.

In fact, $I_i=IV\_S_i$ for all i.

2. Bit i of the encrypted data is computed as $C_i = f(I_i, k)_0 \oplus P_i$ where f is the encryption function of the block cipher and $f(I/k)_0$ denotes bit 0 of the encryption of I with key k.

3. The shift register is updated with the ciphertext so that $S_{i+1} = (S_i <<1)\_C_i$ where S>>1 denotes shifting S left 1 bit.

To decrypt the data a nearly identical algorithm is used except that $P_1$ and $C_1$ are reversed. So the second step of the algorithm is all that changes and it becomes:

2') Bit i of the decrypted data is computed as $P_i = f(I_i, k)_0 \oplus C_i$ where f is the encryption function of the block cipher and $f(I,k)_0$ denotes bit 0 of the encryption of I with key k.

Suitable block ciphers include Triple-DES, IDEA and Blowfish. Suitable stream ciphers include RC4, SEAL and A5. All of these algorithms are discussed in B. Schneier, "Applied Cryptography," John Wiley & Sons, 2d ed. 1996.

The primary defense against replay attacks in this embodiment is checking that the same initialization variable IV is not used twice for any particular account number. When the credit card is issued the internal IV is preferably set to 0. Each time the credit card is used the IV increments by 1. Therefore, as long as the cardholder does not use the credit card more than $2^n$ times (where the IV is m bits long) the same initialization variable will never be repeated. Preferably, the credit card issuer keeps track of the IVs that the card holder has used. This can be done with a simple bit array where entry a of the array indicates that IV a has been used if and only if it is set to 1.

As stated earlier, m=9 is probably sufficient for most cardholders. This means that the card issuer needs only keep track of a 512-bit array for each such credit card. This is very inexpensive. In addition, if the issuer notices that the cardholder has nearly exhausted his IVs, then it can issue the cardholder a new card.

Another attack against this system would be to flood the central server with bogus credit card numbers (otherwise known as a denial-of-service attack). One way to make this attack more difficult is to spread the authorization processing load across several servers which all have the capability of verifying a credit card number. If they receive a valid credit card number, they can coordinate with the central server to perform the credit card transaction.

Ideally, the load should be spread evenly across several different servers. A simple way to do this is to set up p servers and assign each a unique number in the range 0 to $2^p-1$. Next, for every credit card number that must be verified, check a prespecified set of p bits of the credit card number and assign the verification to the server with the corresponding number. For example, if the p specified bits of the credit card number give "14," assign the verification to the server numbered "14."

For the primary embodiment, there are $2^{53}$ possible credit card numbers. A central authority might be established to assign ranges of account numbers to individual credit card companies. Once a company receives an r-bit range of account numbers it may further split the range of numbers up as desired. Ultimately the issuer should decide upon the size of the nonce (n bits), the account number (a bits), and the size of the IV (m bits) so that n+a+m=r. Note that the account number should include those bits assigned by the central authority. Also, different card holders can have different values of n, a, and m even if they receive their cards from the same credit card company.

After a cardholder's card expires, his account number can be reused. The next credit card issued with that account number would use a different nonce and private key. This will ensure that any credit card numbers generated with the old credit card will not match any new credit card numbers with better than random chance.

In an alternative to the present embodiment, timestamps could be included with the nonce during encryption. Then, credit cards could be used in conjunction with a clock. When creating the credit card the credit card issuer should start the clock at 0 and note the offset from its own clock, storing the difference with the card holder's account information (for example in the database 411). Then when a credit card issuer desires to validate a timestamp created by the credit card, it may simply add the timestamp to the offset stored with the card holder's account and then compare the result against its own clock. If the time falls within a specified time window then the timestamp should be considered valid.

In order for the credit card issuer to verify a single-use credit card number, it must know to which account the credit card number belongs. Instead of encoding the account number as part of the credit card number, the name that appears on the card could take the place of the account number. In that case every credit card must have a different name printed on the card. The trade-off in this instance is that many more bits become available in the credit card number since they are not used to encode the account number. They can then be used to encode a timestamp, purchase information, or even merchant information.

Second Embodiment

Lists of Single-Use Credit Card Numbers

In this embodiment, the device memory 104 includes a database with a list of single-use credit card numbers and a flag for each number indicating whether the number has already been used. The single-use credit card numbers are assigned to the cardholder by the credit card issuer.

One method to assign single-use credit card numbers is as follows. There are $2^{53}$ possible credit card numbers. Some sort of central authority could assign ranges of account numbers to individual credit card companies. Once a company receives an r-bit range of account numbers they can further split the range of numbers up however they please. Ultimately, the credit card company would decide upon the size of the nonce (N bits), the account number (A bits), and the size of the IV (m bits) so that n+a+m=r. The account number would include those bits assigned by the central authority. Also, different card holders can have different values of n, a, and m even if they received their cards from the same credit card company. It is simply up to the company to keep track of the appropriate information.

After a card holder's card expires their account number can be reused. The next credit card issued with that account number should use a different nonce and private key. This will ensure that any credit card numbers generated with the old credit card will not match any new credit card numbers with better than random chance.

Figure 10:
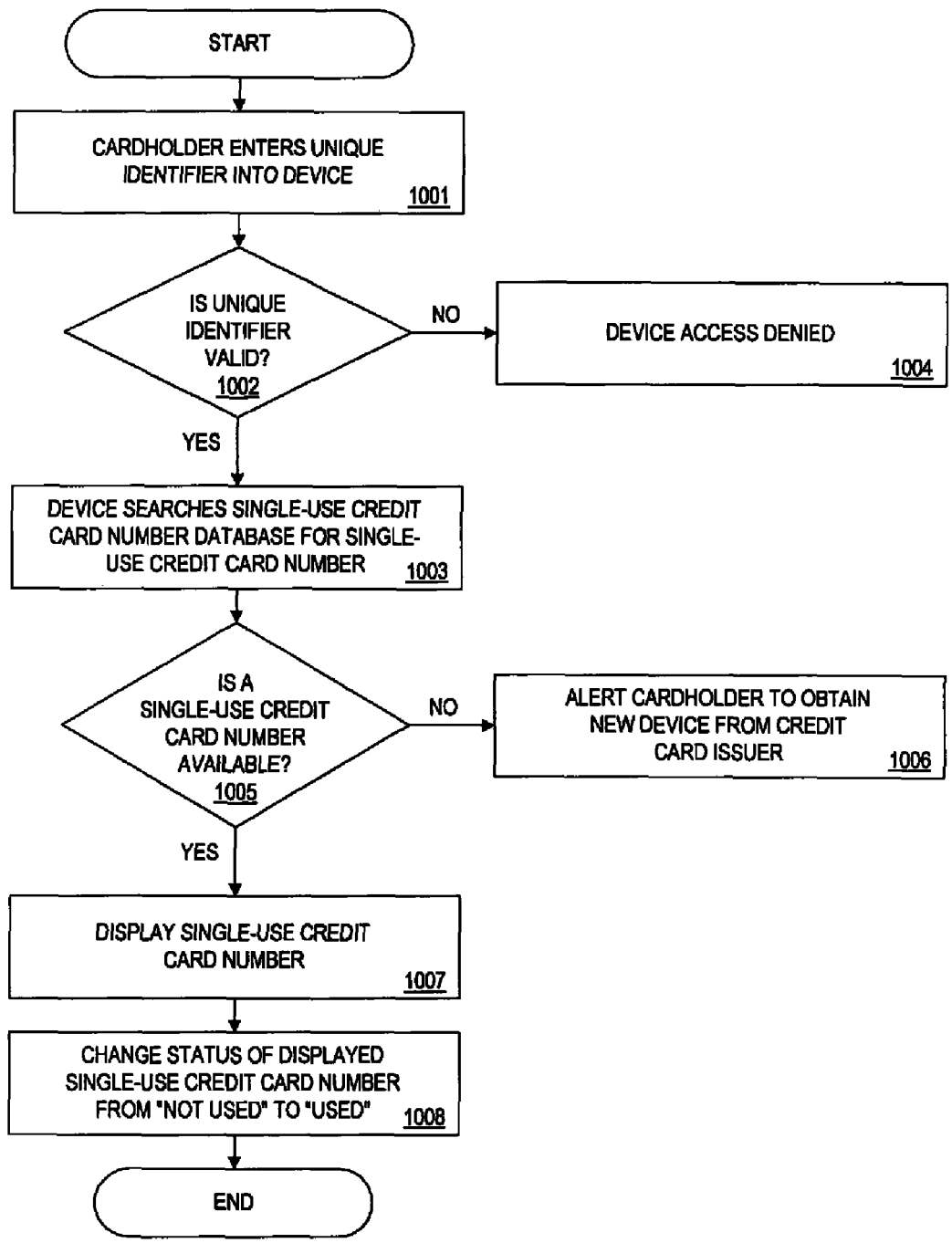
FIG. 10 is a flowchart describing the operations performed by a device to generate and display a single-use credit card number, in accordance with a second embodiment of the invention.

The steps for obtaining a single-use credit card number according to this embodiment are shown in FIG. 10. In step 1001, the cardholder enters his unique identifier (for example, a PIN or biometric data) into the device. The device determines whether the identifier is valid for the device (step 1002); if not, access to the device is denied (step 1004). If the identifier is valid, the device searches the single-use credit card number database in the device memory 104 for a single-use credit card number (step 1003). If a single-use credit card number is available (step 1005), it is displayed on the device display screen 102 (step 1007); if not, a message is displayed instructing the cardholder to obtain a new device (with a new list of single-use credit card numbers) from the credit card issuer (step 1006). The database in the device memory 104 is then updated to change the status of the number from "not used" to "used" (step 1008).

Figure 12:
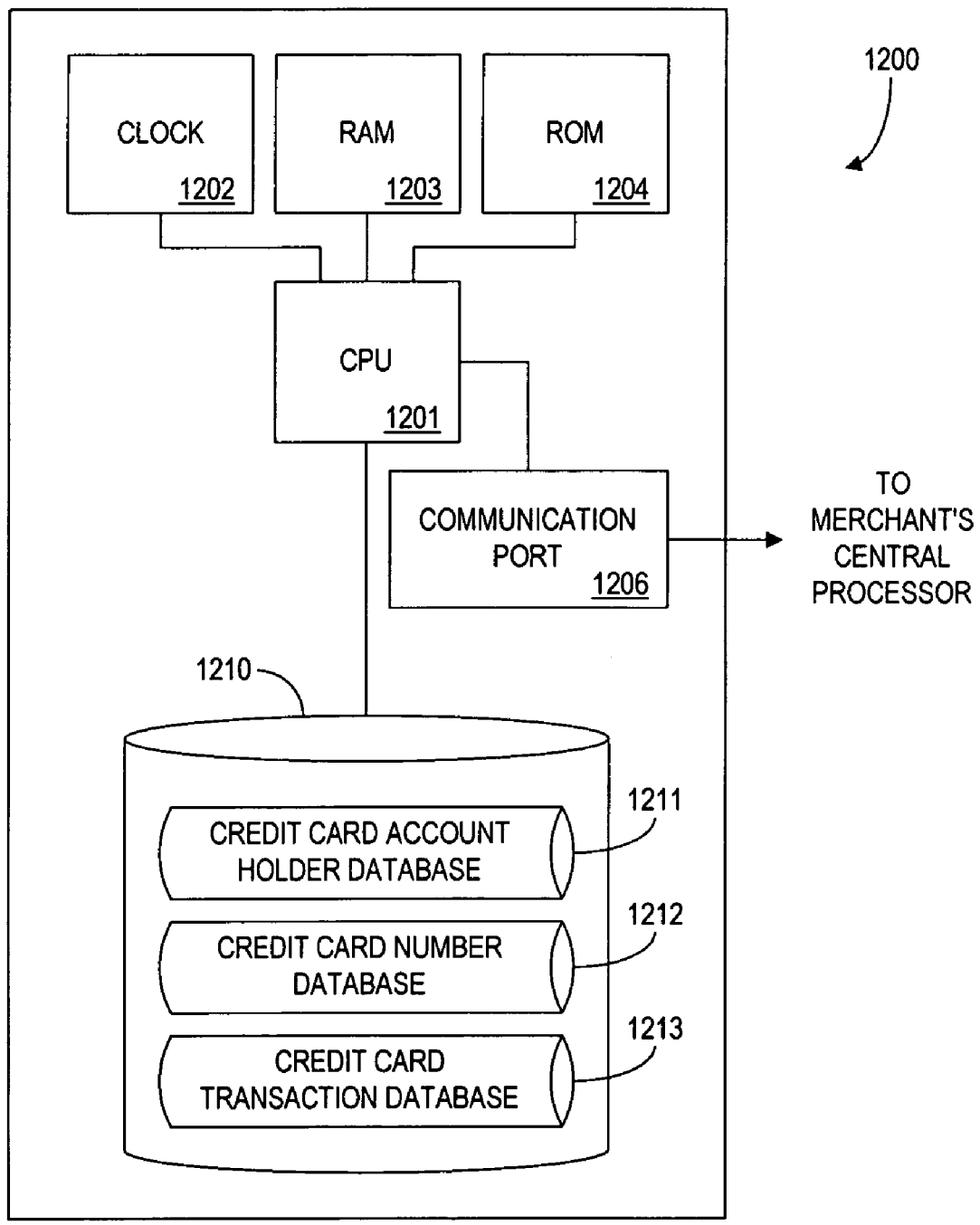
FIG. 12 is a block diagram of the credit card issuer's central processor, with databases as used in accordance with the second embodiment of the invention.

A schematic diagram of the credit card issuer's central processor according to this embodiment is shown in FIG. 12. The processor 1200 includes a central processing unit (CPU) 1201. The CPU is connected to a clock 1202, a random-access memory (RAM) 1203, a read-only memory (ROM) 1204, and a communication port 1206 for communication with the merchant's central processor, similar to the first embodiment. In addition, the CPU 1201 is connected to a data storage device 1210, which includes a credit card account holder database 1211, a credit card number database 1212, and a credit card transaction database 1213. The credit card account holder database 1211 has the same structure as database 411.

The fields of the credit card number database 1212 are shown in FIG. 13. Each cardholder account number 501 is associated with the cardholder name 502 and a list of credit card numbers 1301; each credit card number has associated therewith its status 1302 (used or not used).

The fields of the credit card transaction database 1213 are shown in FIG. 14. Each record of this database corresponds to one transaction using the card, and includes the account number 501, the expiration date 507 of the card, the transaction amount 702, and the merchant identification number 703.

Figure 11A:
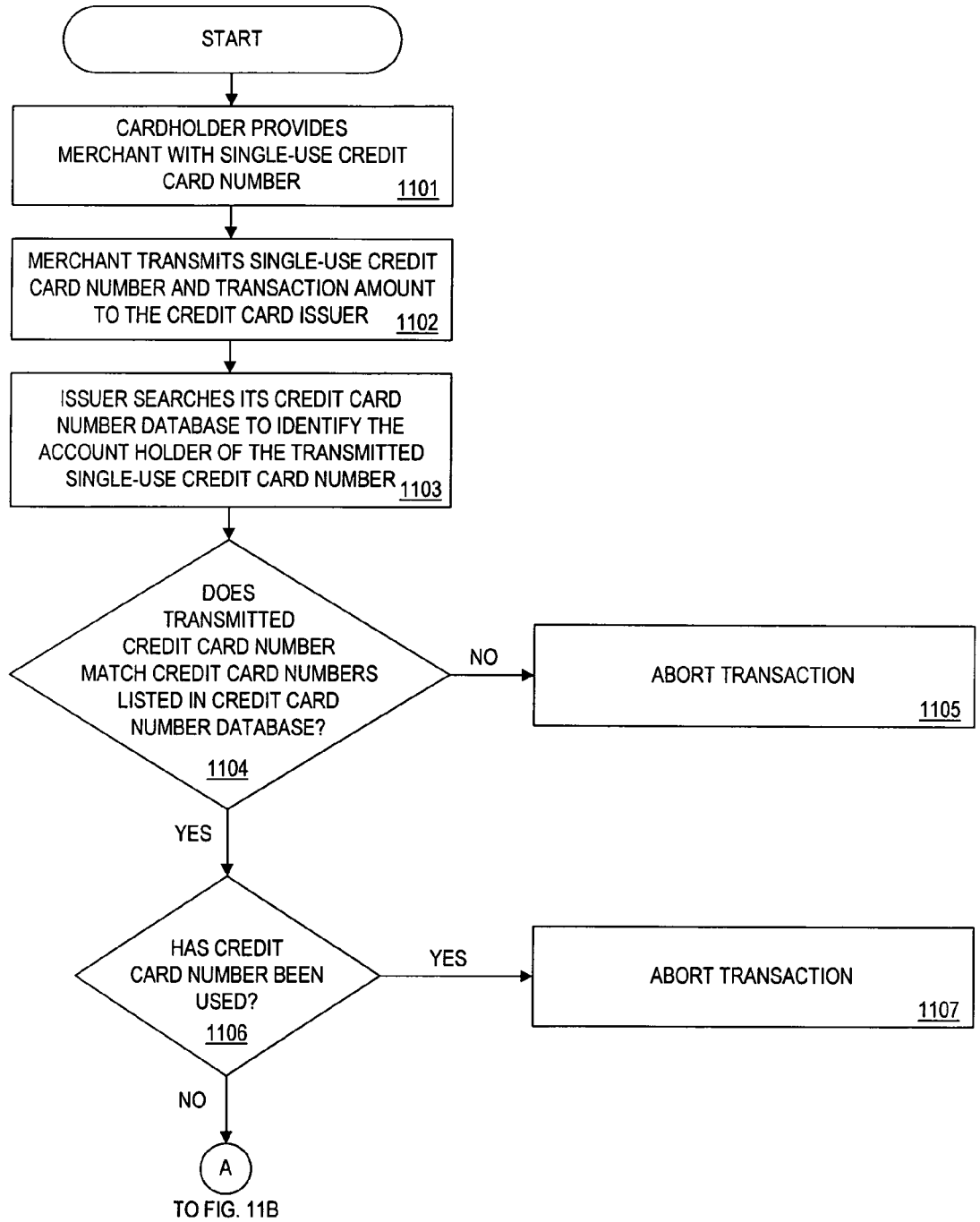
FIGS. 11A and 11B are connected flowcharts describing the operations performed by a credit card issuer's central controller to generate an authorization code, in accordance with the second embodiment of the invention.
Figure 11B:
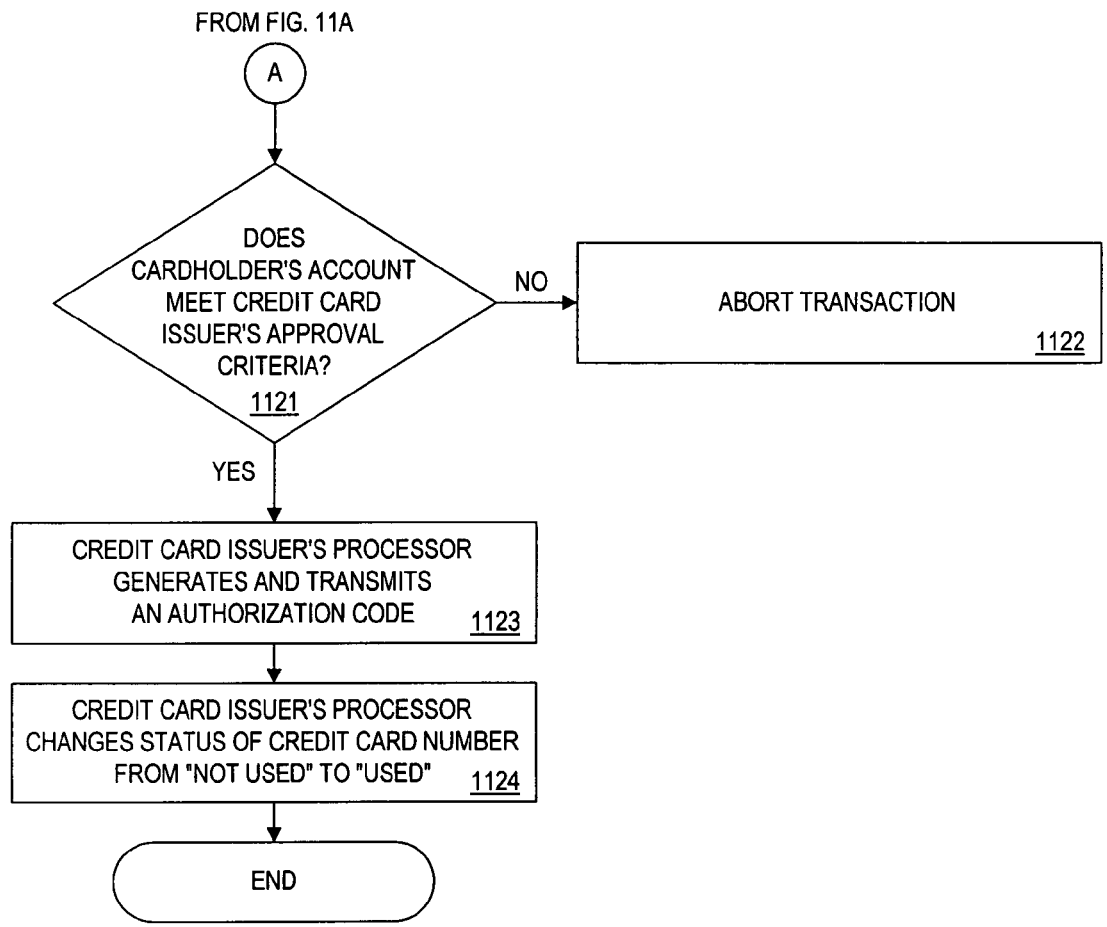

The steps for generating an authorization code for a credit transaction in this embodiment are shown in FIGS. 11A and 11B. In step 1101, the cardholder provides the merchant with a single-use credit card number displayed on the device (see step 1007 of FIG. 10). The merchant then transmits the single-use credit card number and the transaction amount to the credit card issuer's central processor 1200 (step 1102). The central processor searches the credit card number database 1212 to identify the account holder of the transmitted single-use credit card number (step 1103), and determines whether the transmitted credit card number matches a credit card number listed in the credit card number database (step 1104). If there is no match, the credit card number is considered invalid, and the transaction is aborted (step 1105). If there is a match, the credit card number is considered valid, and the central processor checks the status 1302 of the credit card number to determine whether the credit card number has already been used (step 1106). If so, the number is no longer valid, and the transaction is aborted (step 1107).

If the cardholder's account meets the credit card issuer's approval criteria (step 1121), then the issuer's central processor generates an authorization code and transmits the code to the merchant (step 1123). If not, the transaction is aborted (step 1122). Finally, in step 1124, the issuer's central processor changes the status 1302 of the credit card number from "not used" to "used."

While the present invention has been described above in terms of specific embodiments, it is to be understood that the invention is not limited to the disclosed embodiments. On the contrary, the present invention is intended to cover various modifications and equivalent structures included within the spirit and scope of the appended claims.

We claim:

1. A method comprising:
   receiving a product identifier that identifies a product,
      in which the product is associated with a transaction;
   receiving, at a terminal of a merchant, a credit card number
      from a customer as payment for the transaction,
      in which the credit card number is for use only one time,
      in which the credit card number is for use in place of an
         account number that identifies a credit card account,
         and
      in which the credit card number has the same number of
         digits as the account number;
   transmitting, by the terminal, the credit card number for
      authorization of the transaction;
   receiving, by the terminal, information indicating whether
      the transaction is authorized; and
   providing the product to the customer if the transaction is
      authorized.

2. A method comprising:
   receiving a product identifier that identifies a product,
      in which the product is associated with a transaction;
   receiving, at a terminal of a merchant, a single-use credit
      card number from a cardholder,
      in which the single-use credit card number is for use only
         one time,
      in which the single-use credit card number is for use in
         place of an account number that identifies the cardholder, and in which the single-use credit card number has the same number of digits as the account number;

determining a transaction amount that is associated with the transaction;

after receiving the single-use credit card number from the cardholder, transmitting, by the terminal, the single-use credit card number and the transaction amount to a credit card issuer for authorization of the transaction;

receiving, by the terminal, information from the credit card issuer indicating whether the credit card account has sufficient credit available for the transaction; and providing the product to the customer based on the information from the credit card issuer.

3. A method comprising:

receiving, at a terminal of a merchant, a single-use credit card number, in which the single-use credit card number is for use only one time, in which the single-use credit card number is for use in place of an account number that identifies a credit card account, and in which the single-use credit card number has the same number of digits as the account number;

receiving, at the terminal, an indication of an amount of a purchase;

after receiving the single-use credit card number at the terminal, transmitting, from the terminal, the single-use credit card number and the amount of the purchase to a credit card issuer for authorization of the purchase; and receiving, at the terminal, information from the credit card issuer indicating whether the purchase is authorized.

4. The method of claim 3, in which receiving the single-use credit card number comprises:

receiving the single-use credit card number via the Internet.

5. The method of claim 3, in which receiving the single-use credit card number comprises:

receiving the single-use credit card number via a telephone.

6. The method of claim 3, further comprising:

providing the product to a customer if the purchase is authorized.

7. The method of claim 3, further comprising:

receiving, at the terminal, information from the credit card issuer indicating whether the credit card account has sufficient credit available for the purchase.

8. The method of claim 3, further comprising:

receiving, at the terminal, information from the credit card issuer indicating whether the single-use credit card number is valid.

* * * * *